US006822775B2

(12) United States Patent
Suzuki et al.

(10) Patent No.: US 6,822,775 B2
(45) Date of Patent: Nov. 23, 2004

(54) METHOD AND APPARATUS FOR POLYGON MIRROR SCANNING CAPABLE OF PERFORMING A STABLE HIGH SPEED POLYGON MIRROR ROTATION

(75) Inventors: Mitsuo Suzuki, Kanagawa-ken (JP); Yukio Itami, Kanagawa-ken (JP); Masahiko Katoh, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 166 days.

(21) Appl. No.: 10/226,344

(22) Filed: Aug. 23, 2002

(65) Prior Publication Data

US 2003/0160529 A1 Aug. 28, 2003

(30) Foreign Application Priority Data

Aug. 23, 2001 (JP) ........................................ 2001-252309
Oct. 26, 2001 (JP) ........................................ 2001-329592

(51) Int. Cl.[7] .............................................. G02B 26/08
(52) U.S. Cl. ........................ 359/216; 359/198; 359/200; 310/90.5
(58) Field of Search ................................. 359/196–226, 359/900; 310/40 R, 46, 66, 90, 90.5, 272; 384/100, 115, 121, 123, 907.1

(56) References Cited

U.S. PATENT DOCUMENTS

| 4,726,640 | A |  | 2/1988 | Iwama et al. |
|---|---|---|---|---|
| 5,017,987 | A |  | 5/1991 | Nanjoh et al. |
| 5,069,515 | A |  | 12/1991 | Itami et al. |
| 5,108,843 | A |  | 4/1992 | Ohtaka et al. |
| 5,304,357 | A |  | 4/1994 | Sato et al. |
| 5,408,113 | A |  | 4/1995 | Kanno et al. |
| 5,448,113 | A |  | 9/1995 | Suzuki et al. |
| 5,453,650 | A |  | 9/1995 | Hashimoto et al. |
| 5,508,477 | A |  | 4/1996 | Kato et al. |
| 5,510,664 | A |  | 4/1996 | Suzuki et al. |
| 5,574,591 | A |  | 11/1996 | Suzuki et al. |
| 5,606,448 | A |  | 2/1997 | Suzuki et al. |
| 5,612,599 | A |  | 3/1997 | Itami et al. |
| 5,633,523 | A |  | 5/1997 | Kato |
| 5,668,413 | A |  | 9/1997 | Nanjo |
| 5,726,699 | A |  | 3/1998 | Itami et al. |
| 5,739,602 | A |  | 4/1998 | Suzuki et al. |
| 5,769,544 | A |  | 6/1998 | Suzuki et al. |
| 5,811,353 | A |  | 9/1998 | Nanjo |
| 5,835,124 | A | * | 11/1998 | Fukita et al. ............... 347/260 |
| 5,909,966 | A |  | 6/1999 | Suzuki et al. |
| 5,969,844 | A |  | 10/1999 | Itami et al. |
| 6,150,698 | A |  | 11/2000 | Ohtsuka et al. |
| 6,150,779 | A |  | 11/2000 | Itami et al. |
| 6,215,974 | B1 |  | 4/2001 | Katoh et al. |
| 6,281,609 | B1 |  | 8/2001 | Itami et al. |
| 6,312,108 | B1 |  | 11/2001 | Kato |
| 6,324,149 | B1 |  | 11/2001 | Mifune et al. |
| 6,332,669 | B1 |  | 12/2001 | Kato et al. |
| 6,367,914 | B1 |  | 4/2002 | Ohtaka et al. |
| 6,465,918 | B1 |  | 10/2002 | Itami et al. |

FOREIGN PATENT DOCUMENTS

| JP | 5-241090 | 9/1993 |
|---|---|---|
| JP | 2000-2851 | 1/2000 |

* cited by examiner

*Primary Examiner*—James Phan
(74) *Attorney, Agent, or Firm*—Oblon, Spivak, McClelland, Maier & Neustadt, P.C.

(57) ABSTRACT

A high speed rotating apparatus including a shaft, a rotary body, and a motor. The rotary body driven by the motor has a hollow into which the shaft is inserted and forms a dynamic pressure air bearing between the rotary body and the shaft. The rotary body includes first and second rotary members. The first rotary member has an inner circumferential surface held for rotation by the dynamic pressure air bearing. The second rotary member has an inner circumferential surface fixed to the outer circumferential surface of the first rotary member through a hardening insertion process. The hardening insertion process is performed such that a tensile strength of the first rotary member is greater than an axial tensile stress to be produced in the inner circumferential surface of the first rotary member.

36 Claims, 5 Drawing Sheets

METHOD AND APPARATUS FOR POLYGON MIRROR SCANNING CAPABLE OF PERFORMING A STABLE HIGH SPEED POLYGON MIRROR ROTATION

BACKGROUND OF THE INVENTION

1. Field of the Invention

The present invention relates to a method and apparatus for polygon mirror scanning, and more particularly to a method and apparatus for polygon mirror scanning capable of performing a high speed polygon mirror rotation without causing a change of balance.

2. Discussion of the Background

In general, a dynamic pressure air bearing motor using a radial dynamic pressure air bearing is adopted to various high speed rotating apparatuses including motors for rotating a polygon mirror used in a laser recording apparatus, a hard disc, an optical disc, etc. The radial dynamic pressure air bearing is a relatively small ring-shaped air space formed between a fixed shaft that forms a radial dynamic pressure bearing and a rotary body having an inner circumferential surface held for free rotation by an outer circumferential surface of the fixed shaft. When the rotary body is driven for rotation, the fixed shaft and the rotary body do not contact each other due to a dynamic air pressure produced in the ring-shaped air space.

To implement a high print speed and a high definition with an image forming apparatus using a laser recording mechanism such as a digital copying machine, a laser printer, etc., it is needed to drive a polygon mirror accommodated in the laser recording mechanism to rotate at an extraordinary high rotational speed, for example 40,000 rpm or higher, and at a high definition.

Conventionally, a ceramic-made dynamic pressure air bearing that allows no shaft locking production, such as galling and burning, is used as a bearing for a high speed polygon scanner. A ceramic is used as a material of a rotary shaft to be held for free rotation which forms a space of a dynamic pressure air bearing in collaboration with a fixed component. Amongst the ceramic materials, alumina having a flexural strength of 300 MPa and a thermal expansion coefficient of $0.7 \times 10^{-5}/°$ C. is the most popular material used for the above purpose due to its relative low cost. On the other hand, an aluminum alloy is generally used as one material of a polygon mirror which is fixed to the outer circumference of the rotary shaft, and the inner circumferential surface of the aluminum-alloy-made polygon mirror is fixed to the outer circumferential surface of the ceramic-made rotary shaft through a hardening insertion process or with an adhesion agent.

To fix the polygon mirror to the rotary shaft, the most common method is the hardening insertion method since it subjects the engagement to an increasing temperature associated with a high rotational speed greater than 40,000 rpm and heat generated by a polygon motor for rotating the polygon mirror. If the fixing is made with an adhesive agent, a fixing force of the adhesive agent will be lowered by a thermal stress due to a difference in a thermal expansion between the two components in the course of the rising temperature. For example, when an adhesive agent is used, the high speed rotary body will cause an imbalanced rotation at a temperature on the order of 90° C. or higher and, as a result, vibration increases.

The hardening insertion process has a drawback, however, in that the ceramic-made rotary shaft produces a stress to constrict the shaft in a radial direction and, since the ceramic is vulnerable, the stress may cause a crack in the ceramic. The crack is a serious problem that may lead to breakage of the rotary body. Even a small crack residing within a surface layer of the inner circumferential surface that does not lead to any breakage may nonetheless degrade the quality of the deflecting functions of the polygon mirror, such as jitter and tracking accuracy properties.

To decrease a constriction stress produced under a relatively low temperature, one way is to reduce a radial margin of two components to be engaged through the hardening insertion. However, when the radial margin is reduced, the binding force weakens and, as a consequence, the engagement may be loosened and disengaged due to a relatively high temperature and a centrifugal force by a relatively high rotational speed. Therefore, the radial margin needs to be greater than a predetermined value.

On the other hand, one way to cope with a radial constriction force produced relative to the ceramic-made rotary body under a relatively low temperature environment is to increase a mechanical strength by using a silicon carbon having flexural strength of 500 MPa and a thermal expansion coefficient of $0.4 \times 10^{-5}/°$ C. or a silicon nitride having a flexural strength of 800 MPa and a thermal expansion coefficient of $0.3 \times 10^{-5}/°$ C. However, since the thermal expansion coefficients of these materials are smaller than that of alumina, the engagement of the two components can be loosened under a relatively high temperature causing an imbalanced rotation.

One example of the polygon mirror is described in Japanese laid-open patent publication No. 5-241090. This example appears to be successful in avoiding the generation of cracks in the ceramic by not using the hardening insertion. However, in this example, both the ceramic ring and yoke are integrally casted with an aluminum-made mirror surface member and an air void inherent in the casting is produced within the material. As a consequence, it becomes difficult to make the mirror surface of the polygon mirror at a high definition. In addition, the air void locally weakens the mechanical strength. Therefore, the above example is not suitable for the high speed polygon scanner which runs over 40,000 rpm.

In addition to the above-described problems of the engagement associated with the polygon mirror and the rotary shaft, the dynamic pressure air bearing motor has another problem of an engagement associated with a rotor magnet and a flange included therein. When the rotor is fixed to the flange with an adhesive agent, this causes a slight displacement between the components and leads to a problem referred to as a "balance change." Since it is extremely difficult in general to give a cross section of a perfect circle to a rotary component by machining, a perfect cross contact with an adhesive agent cannot be made relative to the entire circumferential surface of the rotary component. Therefore, when this rotary component is inserted into a hollow of a counter component, it causes an axial uneven engagement of the two components. In the engagement of the two components, portions of contact and non-contact are subjected to a thermal stress produced by a difference in a thermal expansion coefficient between the two components. Since this thermal stress is far greater than an adhesion strength by the adhesive agent, the fixing of the rotary component to the counter component cannot be maintained and consequently a slight displacement occurs at the portion engaged. In particular, when the polygon motor is driven for rotation over 30,000 rpm, the polygon mirror is exposed to a high temperature on the order of 80° C. or higher and this problem becomes serious.

Japanese Laid-Open patent publication No. 2000-2851, for example, describes a polygon mirror scanner apparatus, that attempts to remedy the above-described problem of the engagement between the rotor magnet and the flange. In this apparatus, a rotor used as a rotary element is formed in a regular prism shape and each surface of the regular prism shape is used as a mirror. Thus, the rotor is used as a polygon mirror. The rotor is provided with a plurality of projections at the bottom thereof for engaging a multipolar magnet and determining the position of the multipolar magnet. This engagement is performed through a press-in insertion without using an adhesive agent. The multipolar magnet is fixed with the press-in insertion without using any adhesive agent. The multipolar magnet is disposed at a position to face a coil used as a fixed element with a predetermined distance. In this way, a brushless type direct current motor is structured.

To perform a press-in insertion, however, tight control of the insertion margin is generally required. In addition, the multipolar magnet is needed to have sufficient strength over the press-in insertion. For example, when an outer diameter is to be held, a material having a relatively high radial crushing strength is needed. Therefore, a metal magnet may be a potential candidate but, its heavy weight is a drawback which produces a relatively large inertial when rotating. Therefore, a metal magnet is not preferable for high speed rotation. In addition, a metal magnet is relatively expensive and has a low output. Furthermore, a sintered magnet is also not suitable for a relatively high speed rotation since it has a relatively low radial crushing strength and, when used, it can chip or fracture.

If a rotor magnet of any suitable material is successfully inserted into a counter component with the press-in insertion, the pressed-in portion of the rotor magnet may be loosened due to an increasing temperature when it is operated at a high speed rotation over 30,000 rpm. This may cause a balance change problem. Therefore, to insert the rotor magnet with the press-in insertion, one must optimize materials of both the rotor magnet and the counter component as well as a press-in insertion method.

SUMMARY OF THE INVENTION

This patent specification describes a novel high speed rotating apparatus. In one non-limiting embodiment, a novel high speed rotating apparatus includes a shaft, a rotary body, and a motor. The rotary body is configured to have a hollow into which the shaft is inserted and forms a dynamic pressure air bearing in a ring-shaped air space formed between the rotary body and the shaft. The rotary body includes first and second rotary members. The first rotary member is configured to have an inner circumferential surface facing the dynamic pressure air bearing which is held for rotation along an outer circumferential surface of the shaft by the dynamic pressure air bearing. The second rotary member is configured to have an inner circumferential surface facing an outer circumferential surface of the first rotary member and which is fixed to the outer circumferential surface of the first rotary member through a hardening insertion process. The motor is configured to drive the rotary body to rotate. With this structure, the hardening insertion process is performed so that a tensile strength of the first rotary member is greater than a tensile stress to be produced in an axial direction in the inner circumferential surface of the first rotary member.

In the above embodiment, a hardening insertion length of the second rotary member relative to the outer circumferential surface of the first rotary member may be 60% or greater of a total length of the first rotary member.

The first rotary member may be provided with a stress damper configured to reduce the tensile stress at a position where the tensile stress becomes maximum.

The second rotary member may include inner and outer rotors. The inner rotor is configured to have an inner circumferential surface which is fixed to the outer circumferential surface of the first rotary member through the hardening insertion process. The outer rotor is configured to have an inner circumferential surface which is fixed to the outer circumferential surface of the inner rotor through the hardening insertion process. With this structure, a thermal expansion coefficient of the first rotary member is smaller than a thermal expansion coefficient of the inner rotor, the thermal expansion coefficient of the inner rotor is smaller than a thermal expansion coefficient of the outer rotor, a Young's modulus of the first rotary member is greater than a Young's modulus of the inner rotor, and the Young's modulus of the inner rotor is greater than a Young's modulus of the outer rotor.

In the above embodiment, a hardening insertion diameter D [mm] and a hardening insertion length $\delta$ [mm] associated with the first and second rotary members satisfy a relationship;

$(D \times 0.0014) < \delta < (D \times 0.030)$, under a Temperature of 20° C.

The first rotary member may have an outer diameter 1.2 times greater than its own inner diameter.

The shaft and the first rotary member may be made of ceramic, and the second rotary member and the inner and outer rotors may be made of metal.

This disclosure further describes a novel high speed rotating apparatus. In one non-limiting embodiment, this novel high speed rotating apparatus includes a fixed shaft, a stator core, a rotary body, and a rotor magnet. The stator core is configured to be fixed inside the fixed shaft. The rotary body is configured to have a hollow into which the fixed shaft is inserted, the rotary body including a fixing portion. The rotor magnet is configured to be fixed to the fixing portion of the rotary body to face the stator core. In this high speed rotating apparatus, an outer circumferential surface of the rotor magnet is cut away by an edge of the fixing portion when the rotor magnet is inserted into the fixing portion of the rotary body through a press-in insertion.

The rotary body may be configured to form a dynamic pressure air bearing in a ring-shaped air space formed between the rotary body and the shaft.

The rotor magnet may include a bond magnet using a plastic binder and the rotary body is made of aluminum alloy.

The bond magnet of the rotor magnet may have a thermal expansion coefficient substantially equal to a thermal expansion coefficient of the aluminum alloy.

The above-mentioned disclosure further describes a novel method of making a high speed rotating apparatus. In one example, this novel method includes the steps of fixing and inserting. The fixing step fixes a rotary sleeve to a flange through a hardening insertion process. The inserting step inserts a rotor magnet into a skirting portion of the flange through a press-in insertion such that an outer circumferential surface of the rotor magnet is cut away by an edge of the skirting portion of the flange.

The above-mentioned method may further include a step of magnetizing the rotor magnet after the inserting step.

This disclosure further describes a novel polygon scanner apparatus. In one example, this novel polygon scanner apparatus includes the above-described high speed rotating apparatus, in which the high speed rotating apparatus further includes a polygon mirror configured to have a regular polygonal mirror.

This disclosure further describes a novel polygon scanner apparatus. In one example, this novel polygon scanner apparatus includes the above-described high speed rotating apparatus, in which the high speed rotating apparatus further includes a polygon mirror configured to have a regular polygonal mirror.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
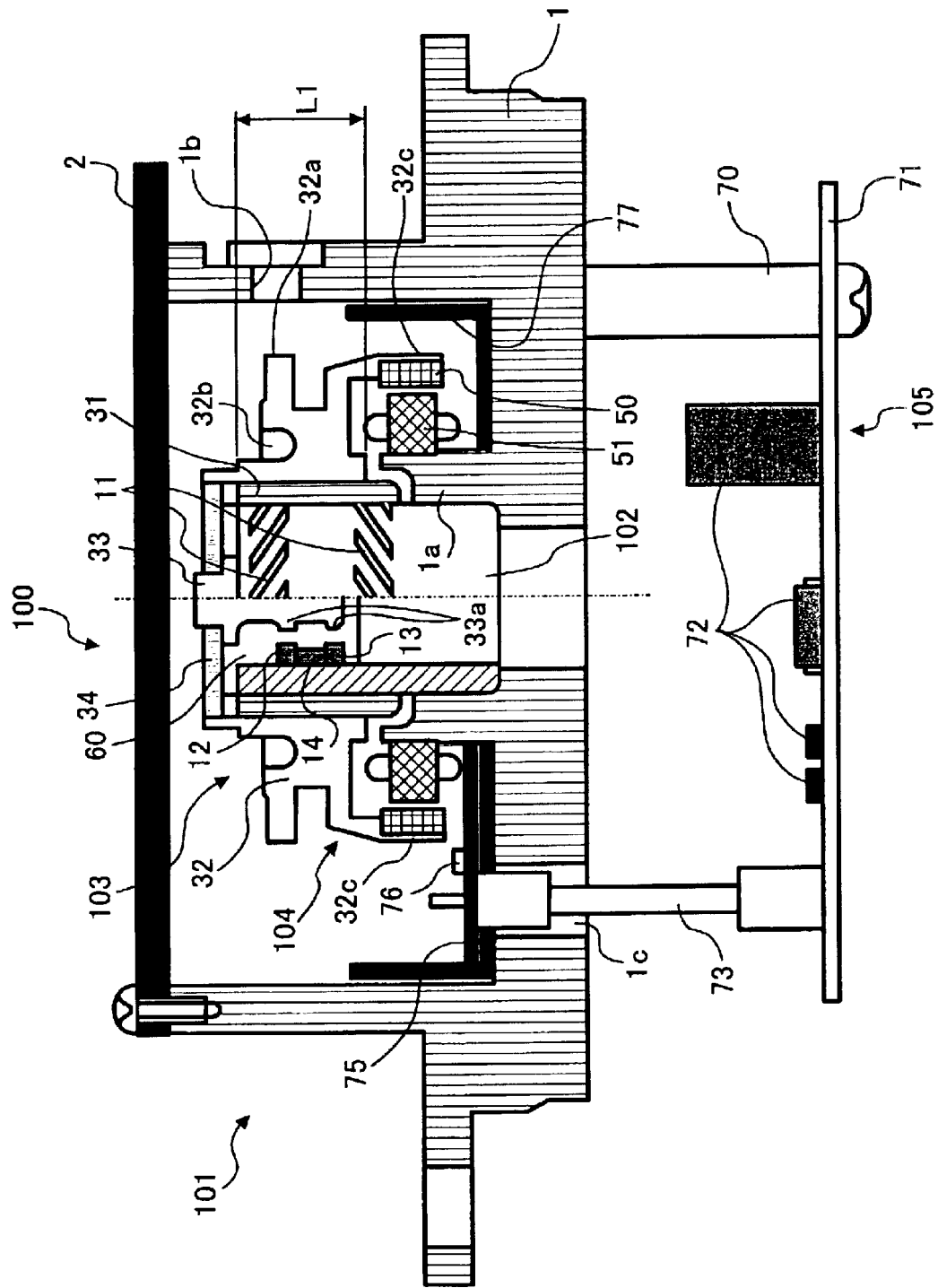
FIG. 1 is a cross-sectional view of a polygon scanner according to a preferred embodiment of the present invention.

In describing preferred embodiments illustrated in the drawings, specific terminology is employed for the sake of clarity. However, the disclosure is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a description is made for a polygon scanner 100 according to a preferred embodiment of the present invention. FIG. 1 illustrates in cross-sectional form the polygon scanner 100 which is a high speed rotating device using a dynamic pressure air bearing.

The polygon scanner 100 includes a housing 101, a fixed shaft 102, a rotary body 103, a motor 104, and an electrical assembly 105.

The housing 101 includes a motor housing 1 and an upper cover 2 which is fixed to the top of the motor housing 1 with screws to seal an opening formed in an upper part of the motor housing 1. The motor housing 1 is provided with a light emitting window 1b at an appropriate position in an outer circumference of the motor housing 1. Through the light emitting window 1b, a light beam deflected by a polygon mirror 32a (explained later) passes through.

The fixed shaft 102 is a shaft accommodated in the housing 101 and which forms a dynamic pressure air bearing in a radial direction. More specifically, the fixed shaft 102 is a tubular member fixedly supported by a tubular projection 1a formed in a middle section of the housing 1. The tubular projection 1a of the housing 1 has an inner circumference gripping a lower part of outer circumference of the fixed shaft 102. The fixed shaft 102 is made of ceramic as is a rotary sleeve 31 (explained later). The fixed shaft 102 has an outer surface in which grooves 11 in a herringbone shape for generating a dynamic pressure are formed. The fixed shaft 102 has an inner surface to which a permanent magnet assembly is arranged. This permanent magnet assembly forms an axial magnetic bearing and includes a magnet 14 and magnetic plates 12 and 13.

The rotary body 103 is held for rotation by the dynamic pressure air bearing formed between the rotary body 103 and the fixed shaft 102. More specifically, the rotary body 103 includes the rotary sleeve 31 (referred to as a ceramic rotary member) and a flange 32 (referred to as a metal rotary member). The rotary sleeve 31 is a tubular member made of ceramic and has an inner surface held by the circumferential surface of the fixed shaft 102 via the dynamic pressure bearing so that the rotary sleeve 31 is held for rotation. The flange 32 is made of aluminum alloy and is fixed to the outer circumferential surface of the rotary sleeve 31 by the process of hardening insertion. This flange 32 has an outer circumferential surface to which the polygon mirror 32a is provided.

A gap of the dynamic pressure bearing is a few microns, formed between the outer circumferential surface of the fixed shaft 102 and the inner circumferential surface of the rotary sleeve 31. The flange 32 of the rotary body 103 has a central opening. To an upper part of this central opening, a lid member 34 made of aluminum alloy is inserted with pressure to be fixed to close an upper opening of the rotary sleeve 31. To the center of the lid member 34, a magnetic rotary yoke 33 that forms a magnetic bearing is fixedly mounted.

Since the lid member 34 is fixed in the central opening of the flange 32 with the press-in insertion, as described above, the lid member 34 does not loosen under high temperature conditions and can maintain a highly accurate balance under high temperature conditions. This is a contrast with a case in which the lid member 34 is fixed with an adhesive agent and is easily loosened under high temperature conditions.

The rotary yoke 33 is plunged into a hollow of the fixed shaft 102, and includes a plurality of projections 33a to face the permanent magnetic assembly that includes the magnet 14 and the magnetic plates 12 and 13. Radial magnetic gaps are formed between the projections 33a and the permanent magnetic assembly. The magnet 14 and the magnetic plates 12 and 13 of the permanent magnetic assembly support the rotary body 103 in the axial direction without contacting it by using the forces of attraction generated in the above-mentioned radial magnetic gaps.

The motor 104, which may be referred to as a dynamic pressure air bearing motor, drives the rotary body 103, and includes a rotor magnet 50 and a stator core 51 (e.g., a wire-wound coil). The rotor magnet 50 is inserted with pressure into a skirting portion 32c provided to a lower part of the flange 32 to be fixed to an inner circumferential surface of the skirting portion 32c. That is, the rotor magnet 50 has an outer circumference fixed to and supported by the inner circumferential surface of the skirting portion 32c so that the rotor magnet 50 avoids breakage in the outer circumference caused by centrifugal force during a high speed rotation. The stator core 51 is fixed to an outer circumferential surface of a tubular projection 1a provided in the middle section of the motor housing 1 and faces the rotor magnet 50 in the radial direction of the rotary body 103. In this way, the rotor magnet 50 and the stator core 51 form an outer rotor type brushless motor.

The rotor magnet 50 is a bond magnet. A magnetic material included in the rotor magnet 50 (i.e., the bond magnet) is a rare earth metal such as a neodymium, a samarium cobalt, etc., or a ferrite, for example, and a binder material used in the rotor magnet 50 (i.e., the bond magnet) is plastic, such as, a nylon or an epoxy resin. This rotor magnet 50 has a thermal expansion coefficient equal to or greater than that of the flange 32.

The flange 32 is provided with a groove 32b in the top surface thereof along in its circumferential direction. This groove 32b is used as an absorber for absorbing a mechanical distortion caused on the polygon mirror 32a with a stress generated when the sleeve 31 and the lid member 34 are fixed through the hardening insertion process and the press-in insertion and also when the temperature rises.

The fixed shaft 102 and the rotary body 103 form an upper space 60 therebetween. The rotary yoke 33, a lower portion closing member (not shown), or the lid member 34, which forms the upper space 60, is provided with a plurality of small through holes (not shown) so that the upper space 60 is connected to an outside of the rotary body 103. By this arrangement, the permanent magnetic assembly, including the magnet 14 and the magnetic plates 12 and 13, has a damping property.

The electrical assembly 105 is located outside the housing 101, and includes a fixing member 70, a printed circuit board 71, and a set of driving circuit components 72. The printed circuit board 71 is fixed to the bottom surface of the motor housing 1 with the fixing member 70, and the set of driving circuit components 72 mounted on the printed circuit board 71 is electrically connected to electrical components disposed inside the motor housing 1 through a harness 73 which is arranged through a hole 1c.

The motor housing 1 is provided inside with a motor driving circuit board 75 on which a Hall effect device 76 is mounted. The Hall effect device 76 outputs a position signal in accordance with a magnetic field generated by the rotor magnet 50. To drive the motor 104, the set of electrical components 72 mounted on the printed circuit board 71 alternately switches excitations of stator winding lines (not shown) with reference to the position signal.

The rotor magnet 50 has a magnetic nature in the radial direction and generates a rotational torque at the gap with the outer circumferential surface of the stator core 51 to rotate. The rotor magnet 50 releases magnetic paths in the outer radial direction and in the height directions, other than in the inner radial direction, and the Hall effect device 76 is arranged in the magnetic paths released as such. A magnetic member 77 has a function for shielding a leakage flux from the rotor magnet 50 to prevent an occurrence of an eddy current in the housing 101.

The polygon scanner 100 performs a balance correction with respect to the rotary body 103 to reduce a vibration during a high speed rotation. That is, an amount of imbalance is needed to be reduced to 5 mg-mm or less to achieve a low vibration at a high speed rotation of 40,000 rpm or higher, for example. The polygon scanner 100 achieves a correction amount of 0.5 mg-mm or less at the position of the radius of 10 mm, for example. The correction is performed at upper and lower positions in the axial direction of the rotary body 103. It is preferable that these upper and lower positions are arranged to be opposite relative to the center of gravity of the rotary body 103.

The correction by removing a part of the rotary body is preferable to the correction by removing a part of an adhesive agency. This is because, if an adhesive agency is an item to be removed for such a delicate correction of 0.5 mg or less, the effective adhesive force may become weak relative to the force required so that the adhesion may be broken at a high speed rotation of 30,000 rpm or higher. In this regard, removing the rotary body with a drill or a laser cut will not cause a break.

The coupling of the rotary sleeve 31 and the flange 32 fixed through the hardening insertion process has an exemplary structure as described below. The rotary sleeve 31 is made of alumina ceramic, and the flange 32 is made of aluminum alloy, as described above. The flange 32 is previously subjected to a heat expansion on a hot plate, for example, and its temperature is increased to 150° C. or higher, for example, so that the inner diameter of the flange 32 is greater than the outer diameter of the rotary sleeve 31. The rotary sleeve 31 is inserted into the expanded flange 32 and is engaged with the inner circumferential surface of the expanded flange 32. After the engagement has taken place, the rotary sleeve 31 and the flange 32 are subjected to cooling so that the flange 32 becomes smaller. Thereby, the hardening insertion process is completed. A margin for the hardening insertion is defined as a difference between the diameters of the rotary sleeve 31 and the flange 32 before or after the execution of the hardening insertion. It is preferable that the margin is in a range of from 14–35 microns with the diameters of 10 mm, a range of from 25–50 microns with the diameters of 18 mm, or a range of from 28–62 microns with the diameters of 20 mm, at the temperature of 20° C. after the hardening insertion. In these ranges, the low limit value is required to prevent a change in balance of the rotary body caused when the portion fixed by the hardening insertion becomes loose due to an increase of centrifugal force and temperature in the course of a high speed rotation. Also, the upper limit value is required to prevent an occurrence of cracks in the ceramic when exposed to a low temperature environment.

Furthermore, it is preferable that a hardening insertion diameter D [mm] and a hardening insertion margin δ [mm] associated with the engagement of the rotary sleeve 31 and the flange 32 are arranged to satisfy the following relationship at a temperature of 20° C.:

$$(D \times 0.014) < \delta < (D \times 0.030).$$

With this arrangement, the prevention of cracks at a lower temperature environment and the implementation of a stably high speed rotation at a high temperature over 90° C. can be achieved.

In addition, in order to secure the strength of the rotary sleeve 31, it is preferable to arrange an inner diameter N [mm] and the diameter D [mm] of the rotary sleeve 31 to satisfy one of the following relationships;

if N is 10, D is 12, if N is 14, D is 16.8, and if N is 20, D is 24.

With this arrangement, the strength of the rotary sleeve 31 is secured while the stability at a high speed rotation and the crack protection are maintained. In any one of the above-indicated relationships, the rotary sleeve 31 is arranged to have the diameter 1.2 times greater than the inner diameter.

Figure 2:
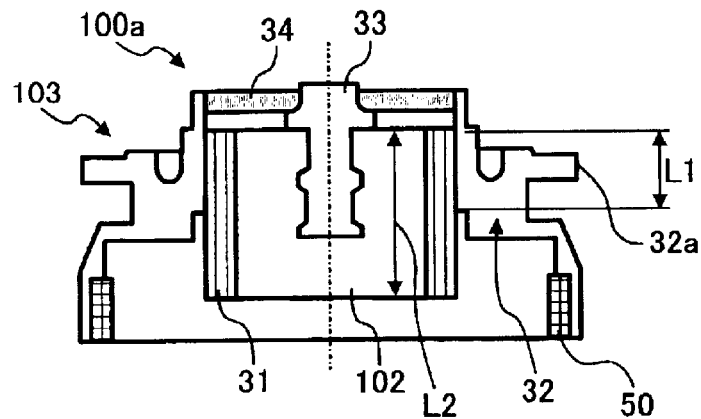
FIG. 2 is a cross-sectional view of a polygon scanner as a comparison example relative to the polygon scanner of FIG. 1.

Next, a mechanism to cause cracks in the rotary sleeve 31 is explained using a polygon scanner 100a as a comparative example shown in FIG. 2. FIG. 2 shows the polygon scanner 100a which is similar to the polygon scanner 100 of FIG. 1, except for a hardening insertion length L1. In this example, a hardening insertion length ratio W is set to 50%. The hardening insertion length ratio W is expressed by an equation; W=L1/L2, wherein L2 represents a length of the rotary sleeve 31. With this hardening insertion length ratio W, the hardening insertion length L1 is too short so that stress may gather to the rotary sleeve 31 and easily causes cracks in the rotary sleeve 31.

In the polygon scanner 100a of FIG. 2, the cracks that are formed in the rotary sleeve 31 may be caused by the following mechanism. Firstly, the flange 32 is fixed to the outer circumference of the rotary sleeve 31 through the hardening insertion. By cooling the rotary sleeve 31 from the temperature of the hardening insertion, the rotary sleeve 31 receives a constricting force from the outer radial direction so that the diameter of the rotary sleeve 31 is reduced. Consequently, the rotary sleeve 31 is fixed to the flange 32. When the rotary sleeve 31 is fixed to the flange 32 in this way, the rotary sleeve 31 receives a stress on its inner circumferential surface represented by a stress distribution curve S2 in a graph shown in FIG. 5. In this graph of FIG. 5, the vertical axis represents a maximum main stress and the horizontal axis represents the entire horizontal length of the rotary sleeve 31. In the maximum main stress acting on the inner circumferential surface of the rotary sleeve 31, a tensile stress in the axial direction is predominant. This tensile stress includes two tensile forces opposite to each other relative to the boundary, which is the peak value of the stress, in the horizontal direction of the graph of FIG. 5. Therefore, if the peak value of the stress exceeds the tensile strength of the rotary sleeve 31, the stress may cause a crack at a position on the circumferential surface in the vicinity of the peak value. In the worst case, the rotary sleeve 31 ruptures in the axial direction.

There are two measures to prevent the above-described crack. A first measure is to increase the strength of material of the rotary sleeve 31. A second measure is to reduce the generation of stress. With respect to the first measure, the material alumina may be strengthened and the crack prevention can be expected to an extent of somewhat 10% by which almost no practical effect can be produced. It may be possible to consider materials having a strength greater than alumina. For example, a silicon carbide has a flexural strength of 500 MPa and a thermal expansion coefficient of $0.4 \times 10-5/°$ C. As another example, a silicon nitride has a flexural strength of 800 MPa and a thermal expansion coefficient of $0.3 \times 10-5/°$ C. As indicated, these materials have relatively low thermal expansion coefficients, and the difference of the thermal expansion coefficient between the rotary sleeve 31 made of these materials and the flange 32 becomes greater. As a result, use of these materials may increase the loosening of the hardening insertion in the course of the operation at a high temperature and a high speed. This finally leads to the imbalanced rotation. Therefore, the first measure is not suitable for the measure of crack prevention. This suggests that the second measure is the one to be taken. However, merely decreasing the margin of the hardening insertion to reduce the stress is not appropriate from the viewpoint of occurrence of the foregoing imbalanced rotation.

Figure 5:
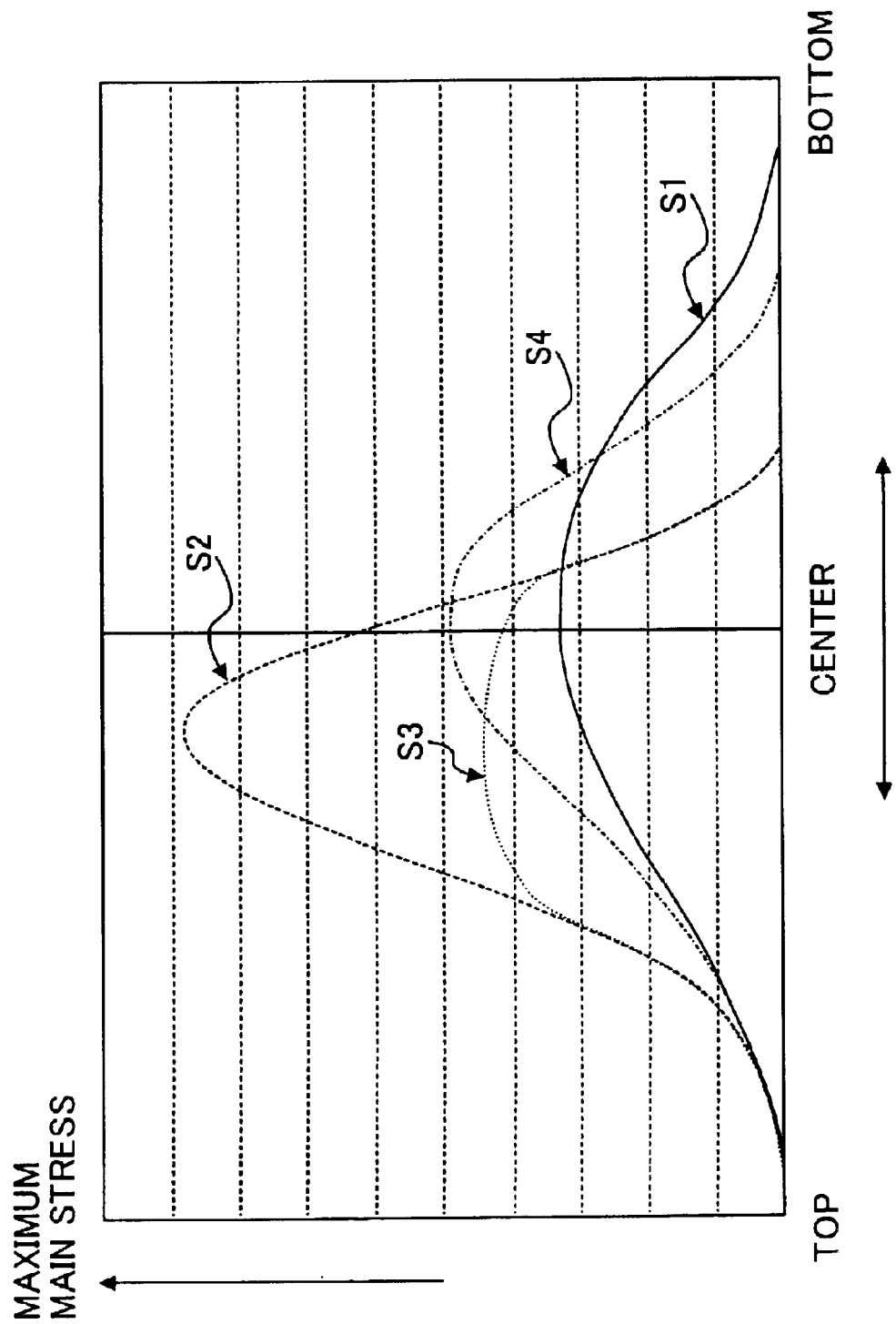
FIG. 5 is a graph for explaining a stress distribution curve associated with the polygon scanners of FIGS. 1–4.

The polygon scanner 100 shown in FIG. 1 accomplishes the crack prevention and the high-accuracy-balance rotation at the same time by optimizing the hardening insertion length. In the polygon scanner 100, the hardening insertion length ratio W is set to 83%. As shown in FIG. 5, a stress distribution curve S1 is applied to this case in which the peak value is largely reduced in comparison with that of the stress distribution curve S2. That is, the polygon scanner 100a produces the stress distribution curve S2 having a local point of an extremely high value and, in comparison with it, the polygon scanner 100 produces the stress distribution curve S1 which is averaged, namely, the local high point is largely lowered. In other words, the stress distribution curve S1 relative to the inner circumferential surface of the rotary sleeve 31 in the axial direction is approximately symmetric with respect to the center of the length L1, having the peak at the center of the length L1. This stress distribution curve S1 is obtained by the increase of the hardening insertion length ratio W from 50% to 83%, as described above.

It is noted that a modified polygon scanner (not shown) having the hardening insertion length ration W of 63% produces an effect that the stress distribution curve is averaged and the peak value is reduced. In consideration of manufacturing tolerances associated with components used, it is understood that the specific effect achieved by the polygon scanner 100 can also be realized by a polygon scanner with the hardening insertion length ratio W of 60% or greater.

The cracks in the rotary sleeve 31 cause not only the damage of a rupture on the rotary sleeve 31 but also, in a case when the cracks remain in a surface layer of the inner circumferential surface, they cause the polygon mirror 32a formed on the outer circumferential surface of the flange 32 to be distorted over its desired flatness. In other words, the cracks in the surface layer loosen and release the stress that remains therein during the hardening insertion process, and they eventually degrade the deflecting functions such as jitter and tracking accuracy properties of the polygon mirror 32a having a high precision flatness and which is integral with the flange 32.

The polygon scanner 100 prevents the above-mentioned flatness problem of the polygon mirror 32a as well.

In this way, the hardening insertion length with respect to the coupling of the rotary sleeve 31 and the flange 32 is optimized relative to the length of the rotary sleeve 31 itself so that the distribution of the stress against the rotary sleeve 31 is averaged and the peak value is lowered. As a result, the cracks are prevented.

Figure 3:
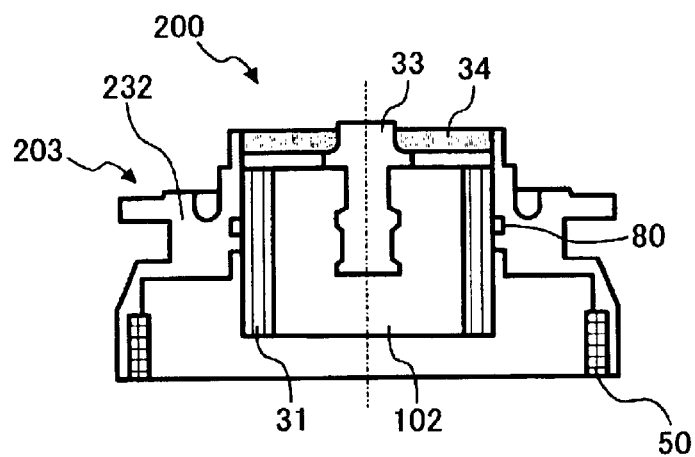
FIG. 3 is a cross-sectional view of another polygon scanner modified based on the polygon scanner of FIG. 1.

Next, a polygon scanner 200 according to another embodiment of the present invention is explained with reference to FIG. 3. FIG. 3 shows in a cross-sectional form the polygon scanner 200 which is similar to the polygon scanner 100, except for a flange 232 of a rotary body 203. In the polygon scanner 200, the hardening insertion length ration W is set to a value smaller than 60%, and more specifically to 50%. However, the polygon scanner 200 is provided with a circumferential groove 80, as shown in FIG. 3, to reduce the peak value of stress produced around the inner circumference of the flange 232 of the rotary body 203, where the engagement by the hardening insertion takes place. The circumferential groove 80 may be referred to as a stress damper. The reduction of the peak value of a stress distribution curve S3 is shown in FIG. 5. In FIG. 5, the stress distribution curve S3 is presented in an area around the point of peak value. It is possible to arrange the circumferential groove 80 to the outer circumferential surface of the rotary sleeve 31. However, the rotary sleeve 31 is not easily trimmed since ceramic is a difficult-to-machine material and, once the rotary sleeve 31 is trimmed, its strength weakens. Therefore, it is preferable to provide the circumferential groove 80 to the flange 232.

With respect to the size of the circumferential groove 80, the width in the axial direction is preferably set to a value less than 30% of the hardening insertion length, since when the width is too large the force of the hardening insertion is excessively weakened.

In addition, the circumferential groove 80 preferably has a radial depth of 0.3 mm or smaller, for a desirable machining, and an axial cross section of a tapered shape such as a trapezoid.

When the hardening insertion length ratio is greater than 50%, the effects of reducing the stress peak value and averaging the stress can both be achieved and as a consequence have the effect of improving the reduction of the stress peak value.

Figure 4:
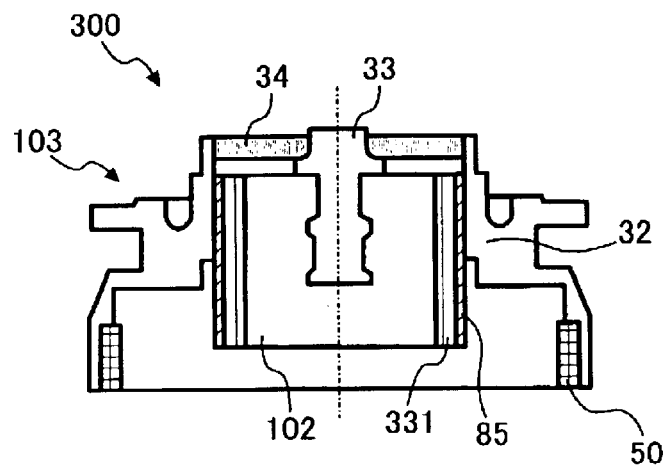
FIG. 4 is a cross-sectional view of another polygon scanner modified based on the polygon scanner of FIG. 1.

Next, a polygon scanner 300 according to another embodiment of the present invention is explained with reference to FIG. 4. FIG. 4 shows in a cross-sectional form the polygon scanner 300 which is similar to the polygon scanner 100, except for a rotary sleeve 331. The polygon scanner 300 is provided with an intermediate member 85 between the rotary sleeve 331 and the flange 32 to prevent generation of excessive stress relative to the rotary sleeve 331. The intermediate member 85 is fixed to the outer circumferential surface of the rotary sleeve 331 through the hardening insertion process and, then, the inner circumferential surface of the flange 32 is fixed to the outer circumferential surface of the intermediate member 85 through the hardening insertion process.

The intermediate member 85 is made of metal and is referred to sometimes as a metal rotary member. The intermediate member 85 has a tubular shape with an even thickness along its entire lengths in the circumferential and axial directions to eliminate generation of uneven stress relative to the rotary sleeve 331 due to the shape of the intermediate member 85. For example, if the axial thickness is not even, the stress produced relative to the rotary sleeve 331 at the position corresponding to a thicker portion of the intermediate member 85 is greater than the stress corresponding to a thinner portion. As a consequence, an axially uneven stress is produced.

The intermediate member 85 is provided with properties of a thermal expansion coefficient and a Young's modulus which are made to have the following relationships relative to those of the rotary sleeve 331 and the flange 32. That is, with respect to the Young's modulus, the rotary sleeve 331 is smaller than the intermediate member 85, and the intermediate member 85 is smaller than the flange 32. With respect to the thermal expansion coefficient, the rotary sleeve 331 is greater than the intermediate member 85, and the intermediate member 85 is greater than the flange 32. Provision of the intermediate member 85 having the above-mentioned relationships is capable of preventing the crack generation under a relatively low temperature environment in a vicinity of the area where the engagement takes place through the hardening insertion process and also the variations in balance of the rotary body 103.

The thermal expansion coefficient of the intermediate member 85 is set to a value between those of the rotary sleeve 331 and the flange 32 so that the engagement, made through the hardening insertion process, is prevented from loosening in a relatively high temperature environment. On the other hand, the Young's modulus of the intermediate member 85 is set to a relatively small value as an outer radial side member so that a generation of a relatively large stress to the rotary sleeve 331 is prevented in a relatively low temperature environment. Namely, when the intermediate member 85 to be fixed through the hardening insertion process has a relatively small Young's modulus, the intermediate member 85 is rather prone to generate a distortion and the rotary sleeve 331 is expected to produce less stress, as a consequence.

Table 1 below shows the preferable materials used and properties chosen for the rotary sleeve, the intermediate member, and the flange. The hardening insertion length ratio of the intermediate member 85 is preferably 60% or greater. If the hardening insertion length ratio is smaller than 50%, a local stress produced around the engagement where the hardening insertion is taking place becomes greater, as indicated in FIG. 5. In Table 1, A represents the components, B represents materials, C represents the thermal expansion coefficients, and D represents the Young's moduli.

TABLE 1

| A | B | C [×10$^{-5}$/° C.] | D [GPa] |
|---|---|---|---|
| Rotary sleeve | Alumina | 0.7 | 300 |
| Intermediate member | Stainless | 1.1 | 204 |
| Flange | aluminum alloy | 2.3 | 69 |

In the polygon scanner 300, if a ceramic such as a silicon carbon or a silicon nitride is chosen, instead of an alumina ceramic, as a material of the rotary sleeve 331, the above-described defects may also be reduced, which are caused due to the difference of the thermal expansion between two components engaged through the hardening insertion process. However, the alumina is preferable as a material for the rotary sleeve 331 since the differences in the thermal expansion of the intermediate member 85 relative to the rotary sleeve 331 and to the flange 32 are relatively small.

The above-described features and structures explained with reference to FIGS. 1–5 may generally be applied not only to the polygon scanner but also to other apparatuses having a rotary body using a dynamic pressure air bearing.

Figure 6:
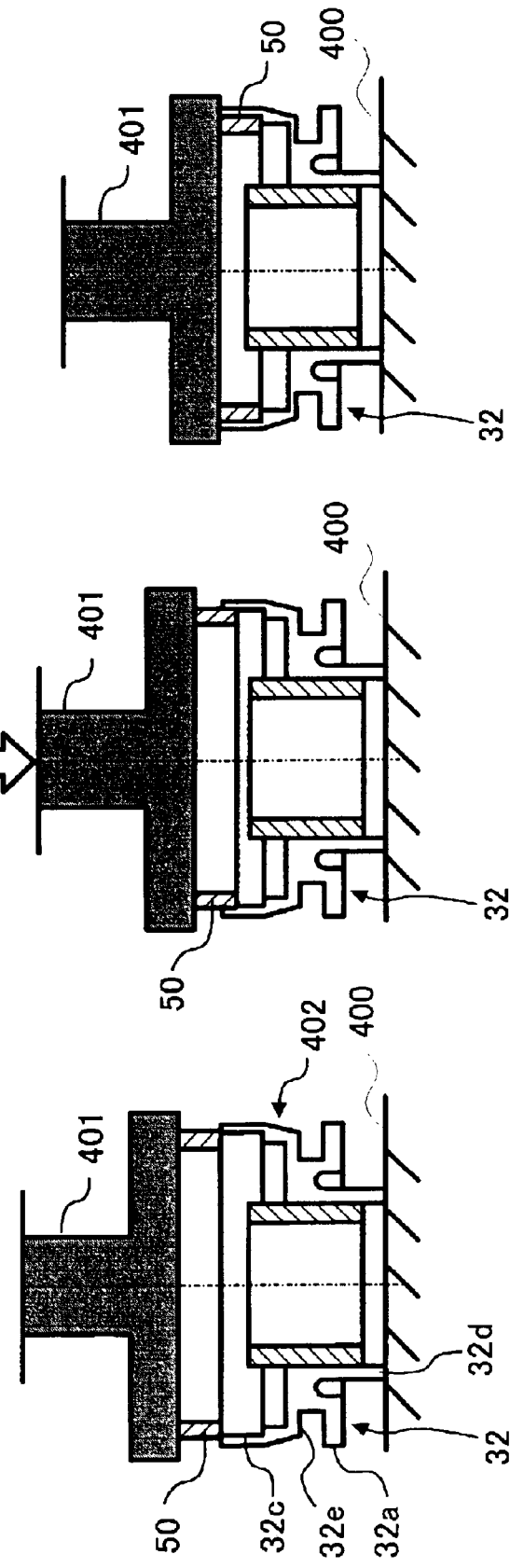
FIGS. 6A–6C are illustrations for explaining a press-in insertion to insert a rotor magnet into a flange of the polygon scanner of FIG. 1.

Next, a press-in insertion associated with the rotor magnet 50 of the polygon scanner 100 of FIG. 1 is explained with reference to FIGS. 6A–6C. In FIGS. 6A–6C, reference numeral 400 denotes a flat plate on which the flange 32 is placed upside down and reference numeral 401 denotes a press member for pressing the rotor magnet 50 into the skirting portion 32c.

As illustrated in FIG. 6A, the rotary sleeve and the flange 32 are previously unified into one piece of a rotary sleeve and flange assembly 402 with the hardening insertion. The rotary sleeve and flange assembly 402 is placed upside down, that is, with the skirting portion 32c up and a top portion 32d of the flange 32 down, on the flat place 400. Then, the rotor magnet 50 is placed on the skirting portion 32c and the press member 401 is placed on the rotor magnet 50. The outer diameter of the rotor magnet 50 is slightly larger than the inner diameter of the skirting portion 32c. After that, as illustrated in FIG. 6B, the press member 401 is slowly lowered to press down the rotor magnet 50 into the skirting portion 32c until the rotor magnet 50 is completely inserted into the skirting portion 32c, as illustrated in FIG. 6C. To lower the press member 401, it is preferable to use a press machine to generate an appropriate pressing force which is preferably a maximum of 2000N to insert the rotor magnet 50 into the skirting portion 32c. If this pressing force of maximum 2000N is born by the top portion 32d placed on the flat plate 400, the load is too large for the top portion 32d so that the top portion 32d may cause a distortion adversely affecting the flatness of the polygon mirror 32a. Therefore, it is preferable to disperse the pressing force and a supporting portion 32e is a preferable portion to bear the load together with the top portion 32d. That is, the supporting portion 32e is a surface perpendicular to the rotating shaft and very close to the skirting portion 32c. The supporting portion 32e is therefore a preferable portion not to produce an adverse affect to the polygon mirror 32a when bearing the above-described pressing force.

Figure 7:
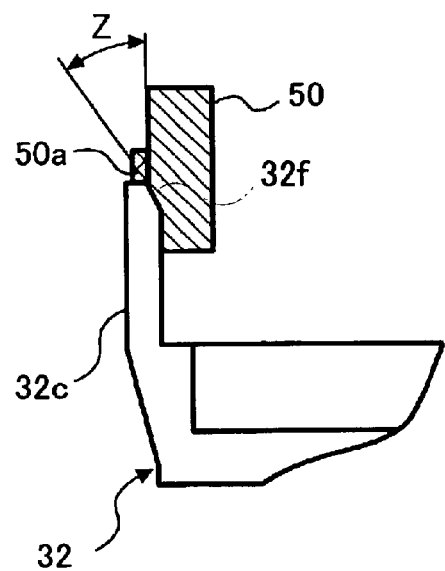
FIGS. 7 and 8 are illustrations for explaining further details of the press-in insertion.

In the polygon scanner 100, the skirting portion 32c is provided with a tapered edge 32f having an acute angle Z relative to the rotation axis direction to guide the rotor magnet 50, as illustrated in FIG. 7, so that the rotor magnet 50 can easily be positioned at the center when the rotor magnet 50 is pressed-in inside the skirting portion 32c. At this time, since the tapered edge 32f has the acute angle Z, the circumferential surface of the rotor magnet 50 is cut away without causing a fracture or chip. Chips 50a chipped off from the rotor magnet 50 are removed from the rotor magnet and flange assembly 402 afterwards.

Figure 8:
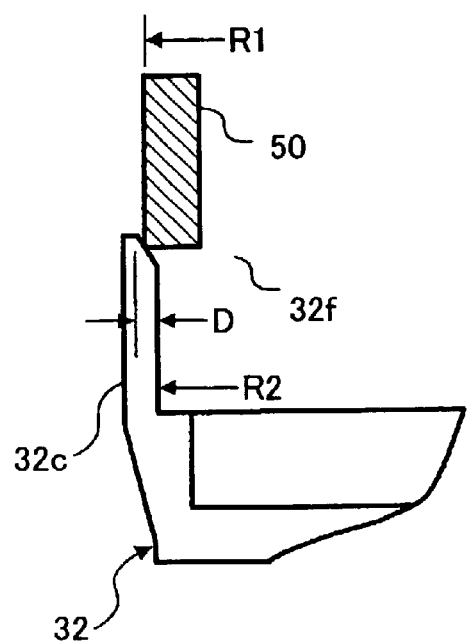

The tapered edge 32f has a depth D which is needed to be greater than a marginal difference between an outer radius R1 of the rotor magnet 50 and an inner radius of the skirting portion 23c of the flange 32, as illustrated in FIG. 8. That is, if the depth D is smaller than the above-mentioned marginal difference, the tapered edge 32f cannot operate its function and the rotor magnet 50 may cause fractures or chipping.

In addition, the marginal difference is also needed to be arranged to an appropriate value within a range of from 0.01 mm to 0.30 mm, for example. If the marginal difference is smaller than 0.01 mm, the pressing force produced becomes too small and the engagement force is weak. As a result, the rotor magnet 50 is prone to be disengaged. On the other hand, if the marginal difference is greater than 0.30 mm, the portion to be chipped off from the rotor magnet 50 becomes large and the press-in insertion is required for a greater pressing force. Furthermore, if the marginal difference is greater than 0.30 mm, the stress acts on the rotor magnet 50 becomes great and a magnetic flux density is decreased. As a result, the rotor magnet 50 may reduce its magnetic property. Therefore, the marginal difference is arranged within a range of from 0.01 mm to 0.30 mm.

In this way, the rotor magnet 50 is engaged with the skirting portion 32c at the center thereof such that the outer circumferential surface of the rotor magnet 50 is totally engaged with the inner circumferential surface of the skirting portion 32c of the flange 32. That is, the outer circumferential surface of the rotor magnet 50 is trimmed to fit to the roundness of the skirting portion 32c, and therefore the trimmed rotor magnet 50 is not an item to be controlled in a close manner. More specifically, to machine the rotor magnet 50, a very general molding tool can be used, having a roundness of 0.1 mm or smaller in a diameter. With this, it becomes unnecessary to carry out a secondary high-precision machining process associated with the rotor magnet 50. Thereby, the rotor magnet 50 is manufactured at a low cost.

If the rotor magnet 50 is adhered to the inner circumferential surface of the skirting portion 32c with an adhesive agent, a tolerance of the engagement associated with the rotor magnet 50 and the skirting portion 32c needs to be closely controlled to prevent a displacement due to the difference between the thermal expansions of them. In this case, the rotor magnet 50 is needed to be machined at a precision level of 0.01 mm or smaller and, in addition, a high-precision molding or a secondary high-precision machining is required. As a result, the manufacturing cost is increased.

It should be noted that the chips 50a produced during the press-in insertion should be perfectly cleared after the press-in insertion. If the chips 50a are not perfectly cleared, they may enter into the few microns space of the dynamic pressure air bearing formed between the rotary sleeve 31 and the fixed shaft 102. As a consequence, the chips 50a cause the galling and increase the friction between the rotary sleeve 31 and the fixed shaft 102, and the rotary body 103 causes an improper rotation. To clear off the chips 50a, adhesive tape or blown air may be used. However, removal of the chips 50a by suction is preferably used since it can perfectly clean off the chips 50a without harming the associated components.

The rotor magnet 50 is magnetized after the cleaning of the chips 50a. This procedure avoids a result that the remaining chips 50a are magnetized so that the chips 50a can easily be removed.

As described above, the rotor magnet 50 has a thermal expansion coefficient equal to or greater than that of the flange 32. When the rotary body 103 is rotated at a relatively high speed, the temperatures of the rotor magnet 50 and the flange 32 are consequently increased producing a thermal expansion force therebetween. At this time, the thermal expansion force acts in a way that increases the engagement force associated with the rotor magnet 50 and the flange 32. Thus, this arrangement prevents a loosening of the engagement of the rotor magnet 50 from the flange 32 and therefore it allows the rotary body 103 to rotate at a high speed without causing a change of balance.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications No. 2001-329592 filed on Oct. 26, 2001 and No. 2001-252309 filed on Aug. 23, 2001, in the Japanese Patent Office, the entire contents of which are hereby incorporated by reference herein.

What is claimed is:

1. A high speed rotating apparatus, comprising:
   a shaft which is fixed;
   a hollow rotary body into which said shaft is inserted forming a dynamic pressure air bearing in a ring-shaped air space between said rotary body and said shaft, said rotary body further comprising:
   a first rotary member having an inner circumferential surface facing said dynamic pressure air bearing which is held for rotation along an outer circumferential surface of said shaft by said dynamic pressure air bearing;
   a second rotary member having an inner circumferential surface facing an outer circumferential surface of said first rotary member which is fixed to said outer circumferential surface of said first rotary member through a hardening insertion process; and
   a motor configured to drive said rotary body to rotate, the motor including a rotor magnet secured to the second rotary member by press-fitting; and wherein
   said hardening insertion process results in a tensile strength of said first rotary member being greater than a tensile stress to be produced in an axial direction in said inner circumferential surface of said first rotary member.

2. The high speed rotating apparatus of claim 1, wherein a hardening insertion length of said second rotary member relative to said outer circumferential surface of said first rotary member is at least 60% of a total length of said first rotary member.

3. The high speed rotating apparatus of claim 1, wherein said first rotary member is provided with a stress damper to reduce said tensile stress at a position where said tensile stress is maximized.

4. The high speed rotating apparatus of claim 1, wherein said second rotary member comprises:
  an inner rotor having an inner circumferential surface fixed to said outer circumferential surface of said first rotary member through the hardening insertion process;
  an outer rotor configured to have an inner circumferential surface fixed to said outer circumferential surface of said inner rotor through the hardening insertion process; and
  wherein a thermal expansion coefficient of said first rotary member is smaller than a thermal expansion coefficient of said inner rotor, said thermal expansion coefficient of said inner rotor is smaller than a thermal expansion coefficient of said outer rotor, a Young's modulus of said first rotary member is greater than a Young's modulus of said inner rotor, and said Young's modulus of said inner rotor is greater than a Young's modulus of said outer rotor.

5. The high speed rotating apparatus of claim 4, wherein said inner rotor and said outer rotor are made of metal.

6. The high speed rotating apparatus of claim 1, wherein a hardening insertion diameter D (mm) and a hardening insertion length δ (mm) associated with said first and second rotary members satisfy a following relationship under 20° C.

$$(D \times 0.014) < \delta < (D \times 0.030).$$

7. The high speed rotating apparatus of claim 1, wherein said first rotary member has an outer diameter 1.2 times greater than its own inner diameter.

8. The high speed rotating apparatus of claim 1, wherein said shaft is made of ceramic.

9. The high speed rotating apparatus of claim 1, wherein said first rotary member is made of ceramic.

10. The high speed rotating apparatus of claim 1, wherein said second rotary member is made of metal.

11. A polygon scanner apparatus, comprising a high speed rotating apparatus as defined by claim 1, wherein said high speed rotating apparatus further comprises a polygon mirror configured to have a regular polygonal mirror.

12. A high speed rotating apparatus, comprising:
  shaft means;
  rotary body means into which said shaft means is inserted to form a dynamic pressure air bearing in a ring-shaped air space between said rotary body means and said shaft means, said rotary body means comprising:
    first rotary means with an inner circumferential surface facing said dynamic pressure air bearing being held for rotation along an outer circumferential surface of said shaft means by said dynamic pressure air bearing;
    second rotary means for having an inner circumferential surface facing an outer circumferential surface of said first rotary means and being fixed to said outer circumferential surface of said first rotary means through a hardening insertion process; and
  motor means for driving said rotary body means to rotate, the motor means including a rotor magnet secured to the second rotary means by press-fitting; and wherein said hardening insertion process results in a tensile strength of said first rotary means being greater than a tensile stress produced in an axial direction in said inner circumferential surface of said first rotary means.

13. The high speed rotating apparatus of claim 12, wherein a hardening insertion length of said second rotary means relative to said outer circumferential surface of said first rotary means is at least 60% of a total length of said first rotary means.

14. The high speed rotating apparatus of claim 12, wherein said first rotary means has stress damping means for reducing said tensile stress at a position where said tensile stress is maximized.

15. The high speed rotating apparatus of claim 12, wherein said second rotary means comprises:
  inner rotor means for having an inner circumferential surface fixed to said outer circumferential surface of said first rotary means through the hardening insertion process;
  outer rotor means for having an inner circumferential surface fixed to said outer circumferential surface of said inner rotor means through the hardening insertion process; and
  wherein a thermal expansion coefficient of said first rotary means is smaller than a thermal expansion coefficient of said inner rotor means, said thermal expansion coefficient of said inner rotor means is smaller than a thermal expansion coefficient of said outer rotor means, a Young's modulus of said first rotary means is greater than a Young's modulus of said inner rotor means, and said Young's modulus of said inner rotor means is greater than a Young's modulus of said outer rotor means.

16. The high speed rotating apparatus of claim 15, wherein said inner rotor means and said outer rotor means are made of metal.

17. The high speed rotating apparatus of claim 12, wherein a hardening insertion diameter D (mm) and a hardening insertion length δ (mm) associated with said first and second rotary means satisfy a following relationship under 20° C.

$$(D \times 0.014) < \delta < (D \times 0.030).$$

18. The high speed rotating apparatus of claim 12, wherein said first rotary means has an outer diameter 1.2 times greater than its own inner diameter.

19. The high speed rotating apparatus of claim 12, wherein said shaft means is made of ceramic.

20. The high speed rotating apparatus of claim 12, wherein said first rotary means is made of ceramic.

21. The high speed rotating apparatus of claim 12, wherein said second rotary means is made of metal.

22. A high speed rotating apparatus, comprising:
  a fixed shaft;
  a stator core configured to be fixed inside said fixed shaft;
  a rotary body configured to have a hollow into which said fixed shaft is inserted, said rotary body including a fixing portion;
  a rotor magnet configured to be fixed to said fixing portion of said rotary body to face said stator core; and
  wherein an outer circumferential surface of said rotor magnet is cut away by an edge of said fixing portion when said rotor magnet is inserted to said fixing portion of the rotary body through a press-in insertion.

23. The high speed rotating apparatus of claim 22, wherein said rotary body configured to form a dynamic pressure air bearing in a ring-shaped air space formed between said rotary body and said shaft.

24. The high speed rotating apparatus of claim 22, wherein said rotor magnet includes a bond magnet using a plastic binder and said rotary body is made of aluminum alloy.

25. The high speed rotating apparatus of claim 24, wherein said bond magnet of the rotor magnet has a thermal expansion coefficient substantially equal to a thermal expansion coefficient of the aluminum alloy.

26. A polygon scanner apparatus, comprising a high speed rotating apparatus as defined by claim 22, wherein said high speed rotating apparatus further comprising a polygon mirror configured to have a regular polygonal mirror.

27. A method of making a high speed rotating apparatus, comprising the steps of:
fixing a rotary sleeve to a flange through a hardening insertion process; and
inserting a rotor magnet into a skirting portion of said flange through a press-in insertion such that an outer circumferential surface of said rotor magnet is cut away by an edge of said skirting portion of said flange.

28. The method of claim 27, further comprising a step of magnetizing said rotor magnet after said inserting step.

29. A high speed rotating apparatus, comprising:
a shaft which is fixed;
a hollow rotary body into which said shaft is inserted forming a dynamic pressure air bearing in a ring-shaped air space between said rotary body and said shaft, said rotary body further comprising:
a first rotary member having an inner circumferential surface facing said dynamic pressure air bearing which is held for rotation along an outer circumferential surface of said shaft by said dynamic pressure air bearing;
a second rotary member having an inner circumferential surface facing an outer circumferential surface of said first rotary member which is fixed to said outer circumferential surface of said first rotary member through a hardening insertion process; and
a motor to drive said rotary body to rotate; wherein
said hardening insertion process results in a tensile strength of said first rotary member being greater than a tensile stress to be produced in an axial direction in said inner circumferential surface of said first rotary member, and
a hardening insertion length of said second rotary member relative to said outer circumferential surface of said first rotary member is at least 60% of a total length of said first rotary member.

30. A high speed rotating apparatus, comprising:
a shaft which is fixed;
a hollow rotary body into which said shaft is inserted forming a dynamic pressure air bearing in a ring-shaped air space between said rotary body and said shaft, said rotary body further comprising:
a first rotary member having an inner circumferential surface facing said dynamic pressure air bearing which is held for rotation along an outer circumferential surface of said shaft by said dynamic pressure air bearing;
a second rotary member having an inner circumferential surface facing an outer circumferential surface of said first rotary member which is fixed to said outer circumferential surface of said first rotary member through a hardening insertion process; and
a motor to drive said rotary body to rotate; wherein
said hardening insertion process results in a tensile strength of said first rotary member being greater than a tensile stress to be produced in an axial direction in said inner circumferential surface of said first rotary member, and
said first rotary member is provided with a stress damper to reduce said tensile stress at a position where said tensile stress is maximized.

31. A high speed rotating apparatus, comprising:
a shaft which is fixed;
a hollow rotary body into which said shaft is inserted forming a dynamic pressure air bearing in a ring-shaped air space between said rotary body and said shaft, said rotary body further comprising:
a first rotary member having an inner circumferential surface facing said dynamic pressure air bearing which is held for rotation along an outer circumferential surface of said shaft by said dynamic pressure air bearing;
a second rotary member having an inner circumferential surface facing an outer circumferential surface of said first rotary member which is fixed to said outer circumferential surface of said first rotary member through a hardening insertion process; and
a motor to drive said rotary body to rotate; wherein
said hardening insertion process results in a tensile strength of said first rotary member being greater than a tensile stress to be produced in an axial direction in said inner circumferential surface of said first rotary member, and
a hardening insertion diameter D (mm) and a hardening insertion length $\delta$ (mm) associated with said first and second rotary members satisfy a following relationship under 20° C.

$$(D \times 0.014) < \delta < (D \times 0.030).$$

32. A high speed rotating apparatus, comprising:
a shaft which is fixed;
a hollow rotary body into which said shaft is inserted forming a dynamic pressure air bearing in a ring-shaped air space between said rotary body and said shaft, said rotary body further comprising:
a first rotary member having an inner circumferential surface facing said dynamic pressure air bearing which is held for rotation along an outer circumferential surface of said shaft by said dynamic pressure air bearing;
a second rotary member having an inner circumferential surface facing an outer circumferential surface of said first rotary member which is fixed to said outer circumferential surface of said first rotary member through a hardening insertion process; and
a motor to drive said rotary body to rotate; wherein
said hardening insertion process results in a tensile strength of said first rotary member being greater than a tensile stress to be produced in an axial direction in said inner circumferential surface of said first rotary member, and
said first rotary member has an outer diameter 1.2 times greater than its own inner diameter.

33. A high speed rotating apparatus, comprising:
shaft means;
rotary body means into which said shaft means is inserted to form a dynamic pressure air bearing in a ring-shaped air space between said rotary body means and said shaft means, said rotary body means comprising:
first rotary means with an inner circumferential surface facing said dynamic pressure air bearing being held for rotation along an outer circumferential surface of said shaft means by said dynamic pressure air bearing;

second rotary means for having an inner circumferential surface facing an outer circumferential surface of said first rotary means and being fixed to said outer circumferential surface of said first rotary means through a hardening insertion process; and motor means for driving said rotary body means to rotate; wherein said hardening insertion process results in a tensile strength of said first rotary means being greater than a tensile stress produced in an axial direction in said inner circumferential surface of said first rotary means, and a hardening insertion length of said second rotary means relative to said outer circumferential surface of said first rotary means is at least 60% of a total length of said first rotary means.

34. A high speed rotating apparatus, comprising:

shaft means;

rotary body means into which said shaft means is inserted to form a dynamic pressure air bearing in a ring-shaped air space between said rotary body means and said shaft means, said rotary body means comprising:

first rotary means with an inner circumferential surface facing said dynamic pressure air bearing being held for rotation along an outer circumferential surface of said shaft means by said dynamic pressure air bearing;

second rotary means for having an inner circumferential surface facing an outer circumferential surface of said first rotary means and being fixed to said outer circumferential surface of said first rotary means through a hardening insertion process; and motor means for driving said rotary body means to rotate; wherein said hardening insertion process results in a tensile strength of said first rotary means being greater than a tensile stress produced in an axial direction in said inner circumferential surface of said first rotary means, and said first rotary means has stress damping means for reducing said tensile stress at a position where said tensile stress is maximized.

35. A high speed rotating apparatus, comprising:

shaft means;

rotary body means into which said shaft means is inserted to form a dynamic pressure air bearing in a ring-shaped air space between said rotary body means and said shaft means, said rotary body means comprising:

first rotary means with an inner circumferential surface facing said dynamic pressure air bearing being held for rotation along an outer circumferential surface of said shaft means by said dynamic pressure air bearing;

second rotary means for having an inner circumferential surface facing an outer circumferential surface of said first rotary means and being fixed to said outer circumferential surface of said first rotary means through a hardening insertion process; and motor means for driving said rotary body means to rotate; wherein said hardening insertion process results in a tensile strength of said first rotary means being greater than a tensile stress produced in an axial direction in said inner circumferential surface of said first rotary means, and a hardening insertion diameter D (mm) and a hardening insertion length $\delta$ (mm) associated with said first and second rotary means satisfy a following relationship under 20° C.

$$(D \times 0.014) < \delta < (D \times 0.030).$$

36. A high speed rotating apparatus, comprising:

shaft means;

rotary body means into which said shaft means is inserted to form a dynamic pressure air bearing in a ring-shaped air space between said rotary body means and said shaft means, said rotary body means comprising:

first rotary means with an inner circumferential surface facing said dynamic pressure air bearing being held for rotation along an outer circumferential surface of said shaft means by said dynamic pressure air bearing;

second rotary means for having an inner circumferential surface facing an outer circumferential surface of said first rotary means and being fixed to said outer circumferential surface of said first rotary means through a hardening insertion process; and motor means for driving said rotary body means to rotate; wherein said hardening insertion process results in a tensile strength of said first rotary means being greater than a tensile stress produced in an axial direction in said inner circumferential surface of said first rotary means, and said first rotary means has an outer diameter 1.2 times greater than its own inner diameter.

* * * * *